(12) United States Patent
Notani et al.

(10) Patent No.: US 6,442,528 B1
(45) Date of Patent: Aug. 27, 2002

(54) EXEMPLAR WORKFLOW USED IN THE DESIGN AND DEPLOYMENT OF A WORKFLOW FOR MULTI-ENTERPRISE COLLABORATION

(75) Inventors: Ranjit N. Notani; Abhay V. Parasnis, both of Irving; Mark B. Whipple, Dallas, all of TX (US)

(73) Assignee: i2 Technologies US, Inc., Dallas, TX (US)

( * ) Notice: Subject to any disclaimer, the term of this patent is extended or adjusted under 35 U.S.C. 154(b) by 0 days.

(21) Appl. No.: 09/156,434

(22) Filed: Sep. 18, 1998

Related U.S. Application Data

(63) Continuation-in-part of application No. 09/092,348, filed on Jun. 5, 1998, now Pat. No. 6,119,149.

(51) Int. Cl.$^7$ ............................................... G06F 17/60
(52) U.S. Cl. ......................................................... 705/9
(58) Field of Search .................... 705/9, 7, 8; 709/101, 709/224, 201; 707/1

(56) References Cited

U.S. PATENT DOCUMENTS

| | | | |
|---|---|---|---|
| 5,321,605 A | 6/1994 | Chapman et al. | 364/402 |
| 5,630,069 A | 5/1997 | Flores et al. | 395/207 |
| 5,634,127 A | 5/1997 | Cloud et al. | 709/313 |
| 5,745,687 A | 4/1998 | Randell | 709/201 |
| 5,931,900 A * | 8/1999 | Notani et al. | 709/201 |
| 6,058,413 A * | 5/2000 | Flores et al. | 709/101 |
| 6,073,109 A | 6/2000 | Flores et al. | 705/8 |
| 6,157,941 A | 12/2000 | Verkler et al. | 709/202 |

FOREIGN PATENT DOCUMENTS

| | | | |
|---|---|---|---|
| WO | WO 98/08177 | 2/1998 | G06F/17/60 |
| WO | WO 99/10825 | 3/1999 | G06F/17/60 |
| WO | WO99/10825 | * 3/1999 | |

OTHER PUBLICATIONS

Liugen et al, Design and implementation of a virtual information system for agile manufacturing; 1997; IIE transactions 1997, 29 (10) 839–857, Dialog abstract.*

Fox, et al., "The Integrated supply Chain Management System," *University of Toronto,* Dec. 07, 1993.

(List continued on next page.)

*Primary Examiner*—James P. Trammell
*Assistant Examiner*—Thomas A. Dixon
(74) *Attorney, Agent, or Firm*—Baker Botts L.L.P.

(57) ABSTRACT

An exemplar workflow is disclosed for use in the design and deployment of a workflow for multi-enterprise collaboration. The computer implemented process involves allowing a workflow design to include at least one exemplar workflow. The exemplar workflow is associated with an exemplar node allowing at least one activity to be parameterized over a plurality of nodes within a node group. The process then involves instantiating the workflow such that the at least one exemplar workflow is instantiated as a plurality of activities each associated with a specific node in the node group. The workflow is deployed by distributing the activities over the nodes in the node group to provide multi-enterprise collaboration.

25 Claims, 11 Drawing Sheets

OTHER PUBLICATIONS

Ciancarini, et al., "A multi–agent process centered environment integrated with the WWW", *IEEE*, 1997.

Sun Microsystems; "Innovative Java technology that simplifies distributed application development"; Internet; http://java.sun.com; downloaded Jan. 1999; all.

David Stirrup, et al.; "Workflow Management Coalition Advances Workflow Interoperability and Business Process Definition Interfaces"; Internet; http://www.aiim.org/wfmc; Feb. 26, 1996; all.

David Stirrup; "Workflow Management Coalition defines Interface between Workflow Engines and Process Definition Information"; Internet; http://www.aiim.org/wfmc; downloaded Jan. 1999; all.

David Hollingsworth; "Workflow Management Coalition The Workflow Reference Model"; The Workflow Management Coalition; Internet; http://www.aiim. org/wfmc; Jan. 19, 1995; all.

Sun Microsystems, Inc.; "Java™ Object Serialization Specification"; Sun Microsystems, Inc.; Internet; http://www-.java.sun.com; Nov. 30, 1998; all.

* cited by examiner

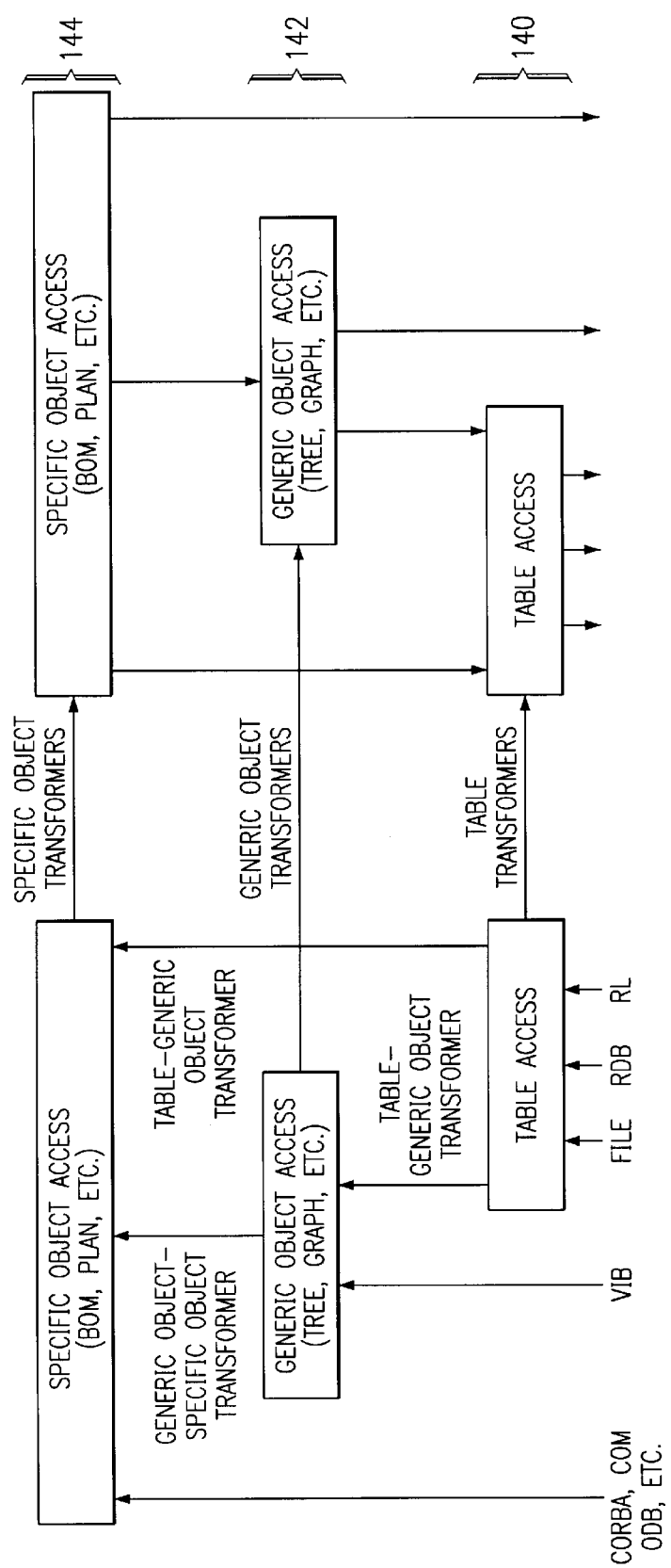

US 6,442,528 B1

EXEMPLAR WORKFLOW USED IN THE DESIGN AND DEPLOYMENT OF A WORKFLOW FOR MULTI-ENTERPRISE COLLABORATION

RELATED APPLICATIONS

This application is a continuation-in-part of U.S. patent Ser. No. 09/092,348, filed Jun. 5, 1998 now U.S. Pat No. 6,119,149. This application is related to U.S. patent application Ser. No. 09/156,722, entitled, "System and Method for Creating an Object Workspace;" U.S. patent application Ser. No. 09/156,265 entitled, "System and Method for Remotely Accessing Data;" U.S. patent application Ser. No. 09/156,264, entitled "Workflow Communication;" U.S. patent application Ser. No. 09/156,333, entitled, "Workflow Synchronization;" U.S. patent application Ser. No. 09/156,342, entitled, "System and Method for Event Notification Through a Firewall;" U.S. patent application Ser. No. 09/154,661, entitled "Object-Oriented Workflow for Enterprise Collaboration;" and U.S. patent application Ser. No. 09/156,334, entitled, "Method and System for Managing Collaboration Within and Between Enterprises;" all filed Sep. 18, 1998, the disclosures of which are incorporated by reference herein.

TECHNICAL FIELD OF THE INVENTION

This invention relates in general to the field of supply chain, enterprise and site planning and, more particularly, to an exemplar workflow used for the design and deployment of a workflow for enterprise collaboration.

BACKGROUND OF THE INVENTION

Supply chain, enterprise and site planning applications and environments are widely used by manufacturing entities for decision support and to help manage operations. Decision support environments for supply chain, enterprise, and site planning have evolved from single-domain, monolithic environments to multi-domain, monolithic environments. Conventional planning software applications are available in a wide range of products offered by various companies. These decision support tools allow entities to more efficiently manage complex manufacturing operations. However, supply chains are generally characterized by multiple, distributed and heterogenous planning environments. Thus, there are limits to the effectiveness of conventional environments when applied to the problem of supply chain planning due to monolithic application architectures. Further, these problems are exacerbated when there is no one "owner" of the entire supply chain.

It is desirable for the next evolutionary step for planning environments to establish a multi-domain, heterogenous architecture that supports products spanning multiple domains, as well as spanning multiple engines and products. The integration of the various planning environments into a seamless solution can enable inter-domain and inter-enterprise supply chain planning. Further, an important function provided by some planning applications is the optimization of the subject environment rather than simply tracking transactions. In particular, the RHYTHM family of products available from I2 TECHNOLOGIES provide optimization functionality. However, with respect to planning at the enterprise or supply chain level, many conventional applications, such as those available from SAP, use enterprise resource planning (ERP) engines and do not provide optimization.

The success or failure of an enterprise can depend to a large extent on the quality of decision making within the enterprise. Thus, decision support software, such as I2 TECHNOLOGIES' RHYTHM family of products, that support optimal decision making within enterprises can be particularly important to the success of the enterprise. In general, optimal decisions are relative to the domain of the decision support where the domain is the extent of the "world" considered in arriving at the decision. For example, the decision being made may be how much of a given item a factory should produce during a given time period. The "optimal" answer depends on the domain of the decision. The domain may be, for example, just the factory itself, the supply chain that contains the factory, the entire enterprise, or the multi-enterprise supply chain. (The latter two can be considered to be larger domains or multiple domains.) Typically, the larger the domain of the decision support, the more optimal the decision will be. Consequently, it is desirable for decision support software to cover ever larger domains in the decision making process. Yet, this broadening of coverage can create significant problems.

SUMMARY OF THE INVENTION

In accordance with the present invention, an exemplar workflow used for the design and deployment of a workflow for enterprise collaboration is disclosed that provides advantages over conventional supply chain, enterprise and site planning environments.

According to one aspect of the present invention, an exemplar workflow is disclosed for use in the design and deployment of a workflow for enterprise collaboration. A computer implemented process involves allowing a workflow design to include at least one exemplar workflow. The exemplar workflow is associated with an exemplar node allowing at least one activity to be parameterized over a plurality of nodes within a node group. The process then involves instantiating the workflow such that at least one exemplar workflow is instantiated as a plurality of activities each associated with a specific node in the node group. The workflow is deployed by distributing the activities over the nodes in the node group to provide multi-enterprise collaboration.

A technical advantage of the present invention is the ability to design, instantiate, deploy, execute, monitor and modify sophisticated multi-enterprise collaborations using an exemplar workflow for a group of related nodes.

Additional technical advantages should be readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 17 is a diagram of one embodiment of different access and transformation levels.

DETAILED DESCRIPTION OF THE INVENTION

Improvement of decision support processes involves expansion to provide enterprise level and multi-enterprise level decision support for optimal decision making. Technologically and conceptually, providing enterprise-level and multi-enterprise level decision support differs from providing factory-level and supply-chain-level decision support. The reasons for this can be that, in multi-domain situations (such as business units within an enterprise or multiple enterprises), the different domains often operate different decision support software. Also, in multi-domain situations, one domain generally can not coerce another domain into making a particular decision. In other words, optimal decision support in this environment often needs to be performed in a negotiated, as opposed to coercive, environment.

Providing decision support in multi-domain situations can be accomplished by pursuing a collaborative approach to decision support rather than a coercive one. Various communication and distributed processing technologies can be used to implement such an environment, including the Internet, the Web, JAVA, XML, CORBA, etc., which help make large scale collaborative decision making feasible. Products will soon be available from I2 TECHNOLOGIES that enable a collaborative approach to decision support, including RHYTHM-GLOBAL COLLABORATION MANAGER (GCM) and RHYTHM-GLOBAL COLLABORATION DESIGNER (GCD).

Collaboration System and Process Components

Figure 1:
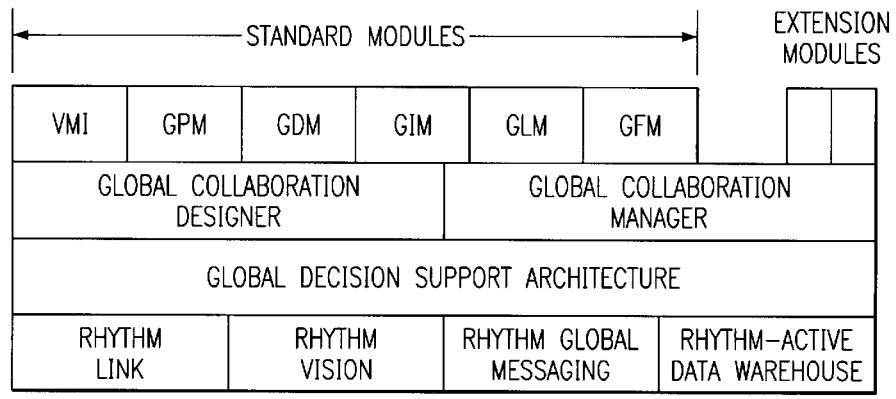
FIG. 1 is a diagram of one embodiment of a computer implemented architecture that can support enterprise collaboration.

FIG. 1 is a diagram of one embodiment of a computer implemented architecture that can support enterprise collaboration. As shown, a global decision support architecture can be built upon underlying link, vision, global messaging and data warehouse components. Collaboration can then involve a global collaboration designer (GCD) and a global collaboration manager (GCM) supported by the decision support architecture. The global collaboration designer can be used to design and instantiate collaborations, and the global collaboration manager can be used to run the collaborations. In this scheme, collaborations can be referred to as modules and can be versioned.

Figure 2:
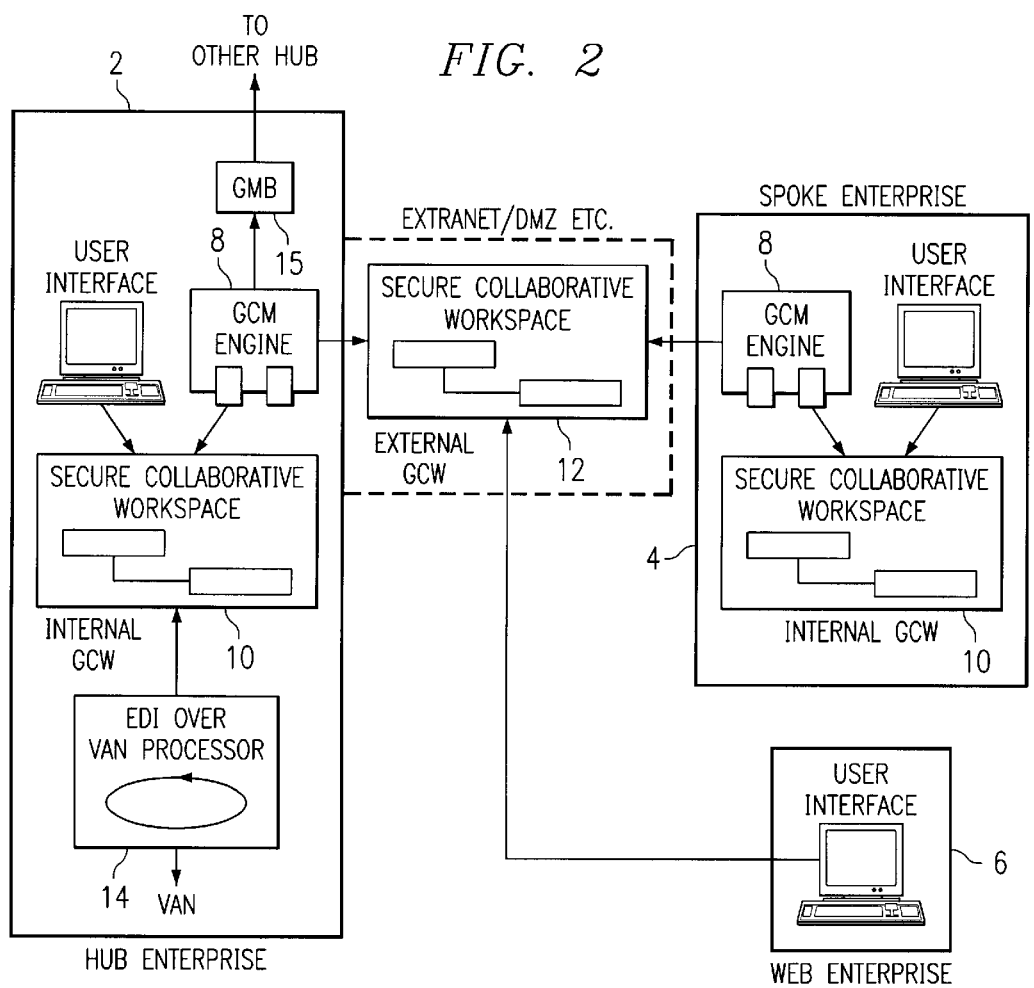
FIG. 2 is a diagram of one embodiment of components of a global collaboration framework.

FIG. 2 is a diagram of one embodiment of components of a global collaboration framework. As shown, the framework can allow an hub enterprise 2 to collaborate with a spoke enterprise 4 and a web enterprise 6. Hub enterprise 2 and spoke enterprise 4 each include a global collaboration manager 8. Global collaboration managers 8 are coupled to and communicate with respective internal global collaboration workspaces 10. An external global collaboration workspace 12 provides a means for sharing data between hub enterprise 2, spoke enterprise 4 and web enterprise 6. Hub enterprise 2 can also collaborate through an electronic data interchange (EDI) processor 14 with a value added network (VAN). Further, hub enterprise 2 can communicate and collaborate with other hub enterprises using a global message bus 15.

In operation, the primary controller of the collaboration can be the GCM engine 8 of hub enterprise 2. The hub-to-hub relationship can be facilitated by the global message bus 15, and the hub-to-spoke and hub-to-web relationships can be facilitated by external global collaboration workspace (GCW) 12. As shown, a hub enterprise 2 can generally have an internal GCW 10 and an external GCW 12. Internal GCW 10 can be used to share and exchange data with internal user interfaces as well as EDI processor 14. External GCW 12 can be used to share and exchange data with spoke enterprises 4 and web enterprises.

For security, external GCW 12 can be installed in a DMZ or outside a corporate firewall of hub enterprise 2. This way no direct connections need to be made from the outside into the protected corporate network of hub enterprise 2. External GCW can accept, for example, IIOP, HTTP and HTTPS connections. In particular, the latter two connections are useful for bridging existing firewall configurations. In this manner, no firewall configuration is needed on either the client (spoke node or web node) or server (hub node) side which can make the solution more quickly deployable.

Figure 3:
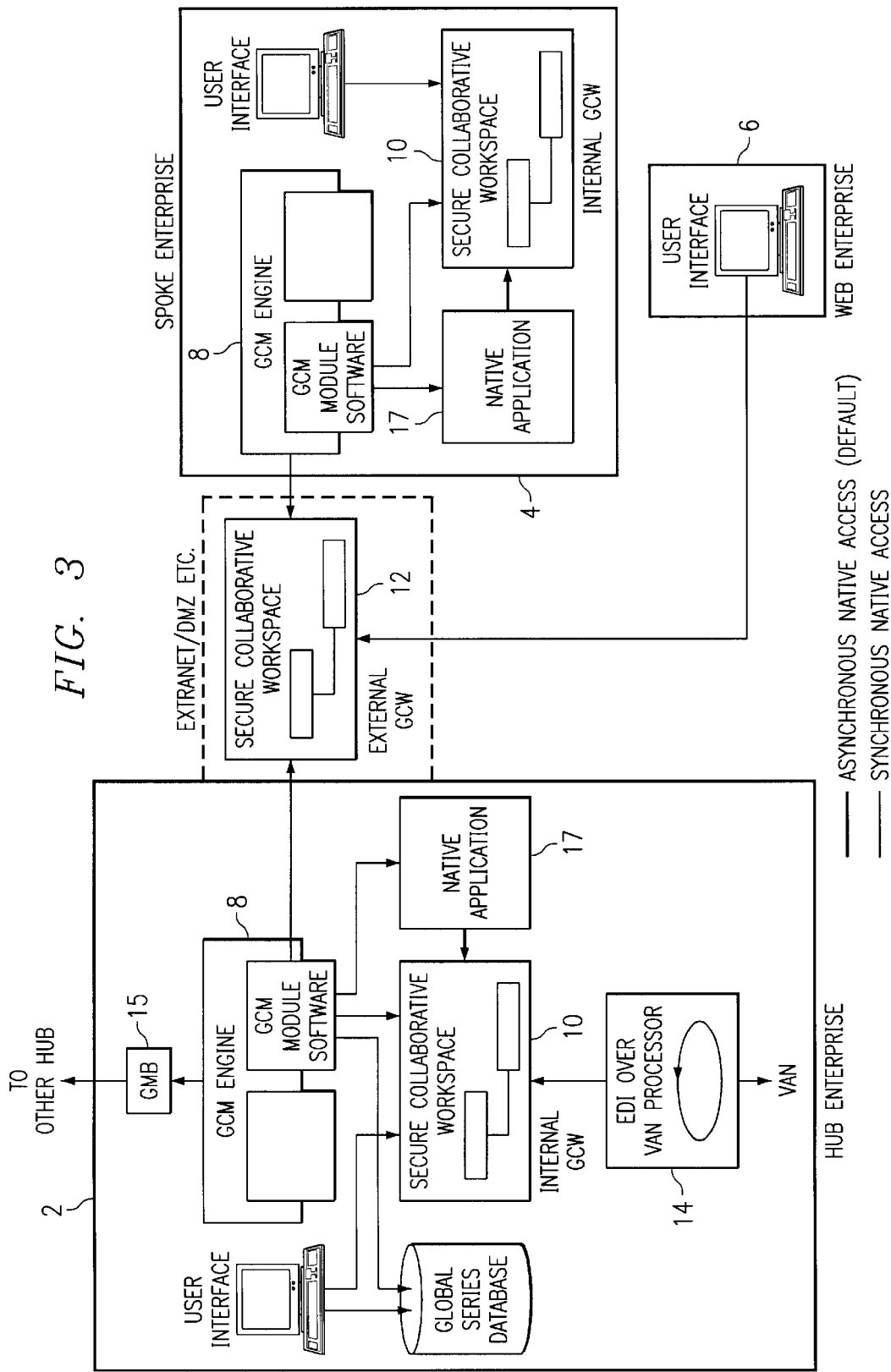
FIG. 3 is a diagram of the global collaboration framework of FIG. 2 where certain software elements that make up particular modules are highlighted.

FIG. 3 is a diagram of the global collaboration framework of FIG. 2 where certain software elements that make up particular modules are highlighted. As can be seen, software for the global collaboration manager module can be present in the following places: in the hub engine 8, in the spoke engine 8, in the hub-user user interface (UI), in the spoke-user UI and in the web-node UI. Additionally, the module can communicate with native applications 17 on the hub enterprise 2 and spoke enterprise 4. Communications with native applications 17 can be either synchronous (dot line) or asynchronous (solid line). Asynchronous communication with native applications 17 can be facilitated by the internal GCW's 10, as shown. Further, a global series database (GSDB) can be present on the hub enterprise 2 side.

Figure 4:
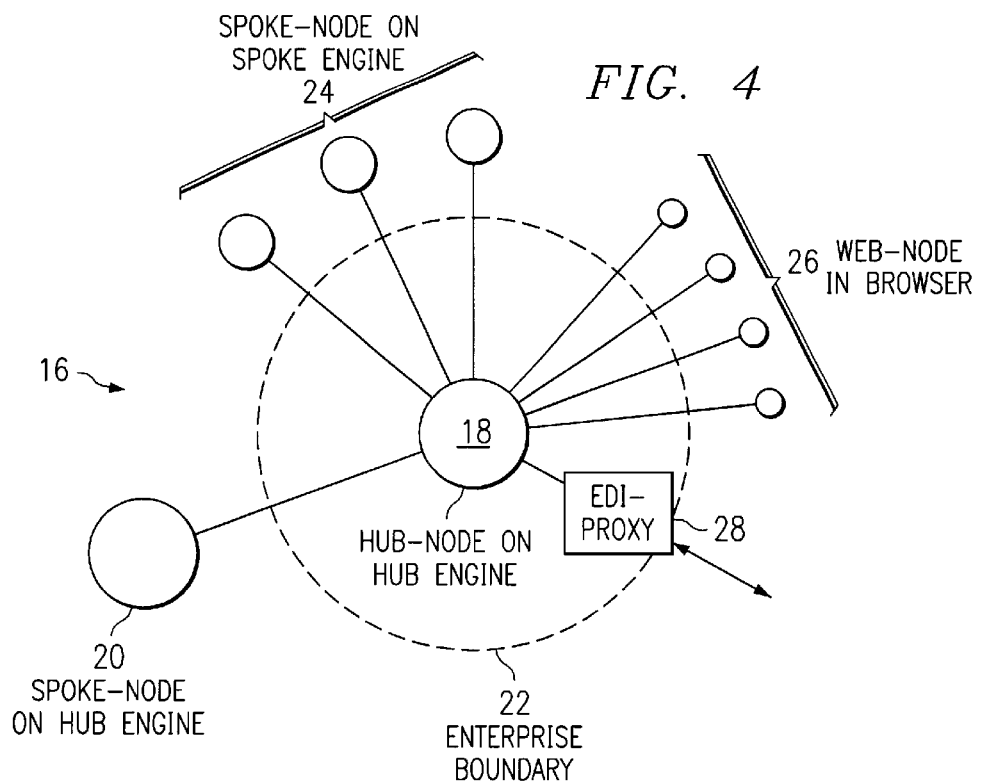
FIG. 4 is a block diagram of one embodiment of a system allowing collaboration within and between enterprises for optimal decision making

FIG. 4 is a block diagram of one embodiment of a system, indicated generally at 16, allowing collaboration within and between enterprises for optimal decision making. As shown, system 16 includes a hub node 18 which can be a process within a hub engine executing on a computer system. Hub node 18 is coupled to and communicates with a spoke node 20 which also can be a process within a hub engine executing on a computer system. As shown, spoke node 20 can be outside an enterprise boundary 22 of hub node 18. Hub node 18 is also coupled to and communicates with a plurality of spoke nodes 24 which can be processes within a spoke engine executing on one or more computer systems. Hub node 18 can further be coupled to and communicate with a plurality of web nodes 26 which can be processes within a web browser executing on a computer system. In addition, hub node 18 is coupled to and communicates with an EDI (Electronic Data Interchange) proxy 28 which can provide a gateway to EDI systems.

Hub engines and spoke engines, together with a global collaboration workspace, can be the primary entities of a global collaboration manager. In this environment, a hub engine is the primary controller of the collaboration. The hub engine can coordinate both global collaborations as well as local collaborations. Global collaborations are those that span hub nodes 18, spoke nodes 20 and 24 and web nodes 26. A local collaboration can run on any single role hub or spoke/spoke group. These collaborations can be distributed, but stay within the confines of a single enterprise. Hub engines can also coordinate with hub-user interfaces (UI) as well as the VAN-EDI processor of an EDI proxy 28. In one embodiment, hub engines are multi-threaded engines that can simultaneously coordinate multiple collaborations as well as multiple versions of the same collaboration. Further, the hub engines can dynamically load and execute collaborations.

A spoke engine can also operate to initiate a collaboration. In this environment, unlike a hub engine, a spoke engine is not an independent entity. Instead a spoke engine can only coordinate a collaboration in conjunction with a hub engine. Furthermore, a spoke engine can not coordinate with other spoke engines or other web-nodes. Like a hub engine, a spoke engine can be multi-threaded and can simultaneously coordinate multiple collaborations as well as multiple versions of the same collaboration. Spoke engines can also dynamically load and execute collaborations.

Figure 5:
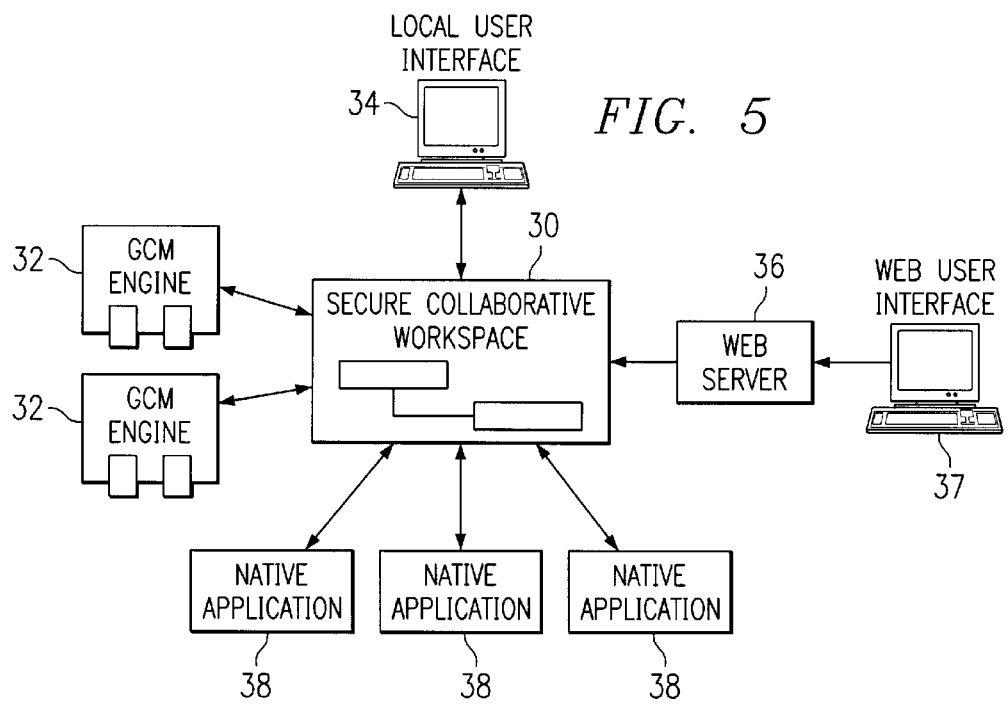
FIG. 5 is a block diagram of one embodiment of the use of a global collaboration workspace.

FIG. 5 is a block diagram of one embodiment of the use of a global collaboration workspace 30. In FIG. 5, global collaboration workspace 30 provides the primary entity used to share data/objects between the various entities in the collaboration. As shown, workspace 30 can interface with global collaboration managers (GCMs) 32, a local system 34, a web server 36 and web interface 37 and native applications 38. In general, objects can be placed into global collaboration workspace 30 by one entity and retrieved by another entity. Retrieval can be achieved either by querying or by subscription. In this way, global collaboration workspace 30 combines the attributes of a database as well as a message bus.

The global collaboration workspace can be organized as a hierarchy of slots which can be in-memory or persistent. Slots also can be queued or regular, and fine grained permissibilities can be attached to each slot. The permissibilities can be assigned by-user-by-operation. The primary operations can be read, write, take, and subscribe.

In-memory slots hold their data in volatile memory. Writing and retrieval from in-memory slots is very fast but subject to loss if the global collaboration workspace 30 goes down. When used with in-memory slots, the global collaboration workspace 30 can be considered a fast, secure, in-memory object database, with security and messaging capabilities. Persistent slots hold their data in stable storage. Writing and retrieval from persistent slots is slower than for in-memory slots, but data is not lost if the global collaboration workspace 30 goes down.

The decision as to whether to use in-memory or persistent slots can depend on the application. Global collaboration workspace 30 stores data in the form of objects and can store Java Objects, CORBA objects or arbitrary byte arrays. This, coupled with its in-memory capabilities, makes global collaboration workspace 30 appropriate as a high-speed data sharing mechanism between other object-oriented in-memory engines such as I2 TECHNOLOGIES' SUPPLY CHAIN PLANNER and FACTORY PLANNER.

A global collaboration designer (GCD) provides a tool to allow collaboration designers to interactively design, instantiate and deploy collaborations to be run using the global collaboration manager. The output of the global collaboration designer is code that can be automatically loaded and run by the global collaboration manager. The global collaboration designer can allow designers to create new collaborations, retrieve existing collaborations, and version collaborations. The global collaboration designer can also allow designers to design the hub and spoke network for collaborations and design the events and messages of the collaboration. The global collaboration designer can integrate a standard object library and a standard component library for easy usage from within the global collaboration designer. The global collaboration designer can be used to create sophisticated multi-enterprise workflows with synchronous, asynchronous, sub-workflow, and-splits, or-splits, synchronization-joins, heterocast-splits, heterocast-joins etc. Global workflows and local workflows can both be created. The global collaboration designer can provide automatic verification of collaborations and automatic code generation, which code is run by the global collaboration manager. The generated code can be manually edited if desired. Further, the global collaboration designer can provide instantiation of a collaboration including generation of security manager configurations and global collaboration workspace configurations.

Figure 6:
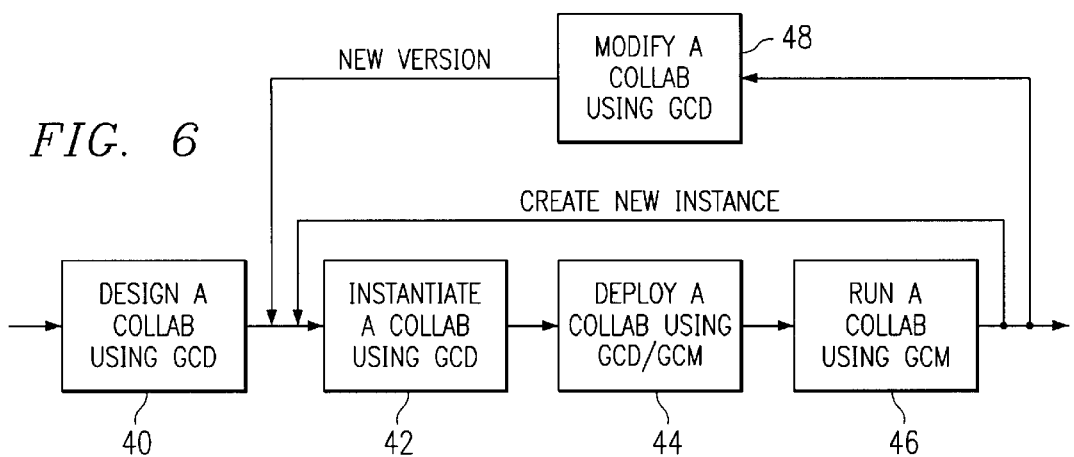
FIG. 6 is a diagram of one embodiment of a lifecycle for a collaboration.

FIG. 6 is a diagram of one embodiment of a lifecycle for a collaboration. As shown, in step, a collaboration can be designed using the global collaboration designer. Then, in step 46, a collaboration can be instantiated using the global collaboration designer. The instantiated collaboration can then be deployed, in step 44, using the global collaboration designer and the global collaboration manager. After deployment, the collaboration can be run using the global collaboration manager in step 46. Subsequently, a new instance can be created or a new version of the collaboration can ve created. To create a new instance, the flow returns to step 42. For a new version, the global collaboration designer can be used in step 48 to modify the collaboration.

The extension from single-domain decision support to multi-domain decision support can be complicated. In particular, the following discussion describes a number of challenges presented by multi-domain decision support and embodiments of how those challenges are addressed by the present system and process allowing collaboration within and between enterprises for optimal decision making.

Representational Heterogeneity

One problem with collaboration is bridging representational heterogeneity across enterprises. Before collaboration can successfully occur, the representational heterogeneity across enterprises needs to be bridged. Enterprises often represent the same data in different ways. These differences range from semantic differences, to technological differences, to differences in naming, etc. One obvious solution to bridging these differences is standardization. However, this immediately raises the issue of what standard to agree upon. The present system and process avoid such a requirement.

It should be noted that there can be three relevant categories of standards that need to be addressed. These three categories are: format standards, transport standards and semantic standards. Format standards refer to the technological formats in which the data/objects are encoded. Examples include XML, Java Serial Streams, IIOP Serial Streams and EDI format. Transport standards are used to pass data around. These can include HTTP, IIOP, RMI, DCOM, FTP, Value Added Networks, Asynchronous Message Buses such as MQSeries, etc. Third, semantic standards are the way in which the semantic content of the data is described. Examples include EDI, I2 COMMON DATA MODEL (CDM).

By considering standards in this light, an understanding of the issues can emerge. A lot of the confusion today stems from the fact that many existing standards cover two or more of the categories above and that discussions of the various standards fail to categorize which category is being discussed. For example, EDI is primarily a semantic standard, but also typically implies a format standard (the EDI file format) and a transport (a Value Added Network). Once this is understood, it becomes clear that the EDI semantic standard can be separated from the other two. Hence, semantic EDI objects can be encoded in other formats such as Java Serial Streams and can be passed over other transport standards such as HTTP. Similarly, XML is primarily a format standard that can be used to encode various semantic standards. Efforts are underway to encode EDI in XML.

Several format standards can be supported by the present global collaboration manager, including XML, EDI format, Java Serial Streams (referred to as Java format and not to be confused with the Java Language or Java Platform) and IIOP Serial Streams. Of these, in one embodiment, the Java format is the primary format, and the rest are derived formats. Because the Java Format can contain the behavior to produce the other formats, it has been chosen as the primary format. XML, EDI and IIOP formats can be derived from the Java Format.

Figure 7A:
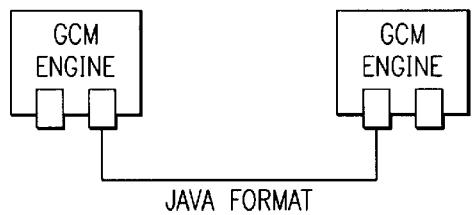
FIG. 7 is a diagram of situations where common software is present on both sides of a relationship and where it is not.
Figure 7B:
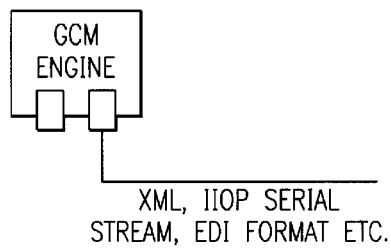

FIG. 7 is a diagram of situations where common software from I2 TECHNOLOGIES' is present on both sides of a relationship and where it is not. As shown, for example, when RHYTHM GLOBAL COLLABORATION MANAGER is on both sides, nothing is to be gained by converting to an intermediate format. This would introduce needless inefficiency, and only data (not objects) would be exchangeable, limiting the range of applications. Hence when the same software is present on both sides, binary Java objects can be directly exchanged. On the other hand, for example, when RHYTHM GLOBAL COLLABORATION MANAGER is present only on one side, XML or EDI-formatted "objects" can be produced (outbound) and interpreted (inbound).

With respect to transport standards, the present global collaboration manager can support a variety of transport standards, including HTTP, IIOP, and Asynchronous Message Buses. More details are provided below with respect to Handling Multiple Relationship Types.

With respect to semantic standards, the present global collaboration manager can primarily support two semantic standards, EDI and RHYTHM-CDM. EDI can be supported because it is generally the most popular semantic standard. However it suffers from the drawback (amongst others) of not providing deep coverage of the planning domain. The RHYTHM-CDM, on the other hand, provides deep coverage of the planning domain and will provide appropriate constructs for performing multi-enterprise decision support. Additionally, this format is supported by all of I2 TECHNOLOGIES' planning engines.

In general, one problem with public standards, such as EDI, is that they may not adequately cover the kinds of data/objects that enterprises would like to exchange. Further, waiting for standards bodies to standardize on a particular object may not be an option, and a supply chain will not have any particular competitive advantage by using public standards. For these and other reasons, the present global collaboration manager supports an alternative approach to standardization by supporting proprietary community standards. For example, using RHYTHM-GCD, a community of enterprises can devise a set of standards that are relevant to that community only.

RHYTHM-GCM will support and enforce these proprietary community standards. RHYTHM-GCD also supports a library of building block objects that can be composed into proprietary community standards. Proprietary community standards have a number of advantages, including: they can be designed to exactly cover the kinds of data/objects that enterprises would like to exchange; only the relevant parties need to agree upon the particular standard, hence the process will be much quicker than waiting for a standards body; different standards can be developed for different categories of partners and, in the extreme case, a different standard for each partner; and standards that give the supply chain a competitive advantage over competitors can be developed.

Multiple Relationship Types

Another problem for allowing collaboration is handling multiple relationship types. Enterprises have relationships of various types with their partners. Some ways relationships can vary are: between major trading partners on the one hand and between minor trading partners on the other; between enterprises of roughly equal influence over the supply chain and between enterprises of unequal influence over the supply chain; and between enterprises with a high degree of technological sophistication on the one hand and between enterprises with an unequal degree of technological sophistication on the other. As should be understood, these different relationship types should be handled differently.

The present global collaboration manager can model enterprise relationships as a hub and spoke network, as described above and shown in FIG. 4. In this embodiment, the four types of relationships are: Hub-to-Web; Hub-to-Van-EDI; Hub-to-Spoke and Hub-to-Hub. Each relationship-type has its appropriate usage.

With respect to Hub-to-Web, when people speak of E-Commerce today, they often imply an architecture where a web browser talks to some centralized server. This architecture has some advantages: the infrastructure to support this architecture is typically already in place; and all administration can be centralized on the server side. However, this architecture also has a big disadvantage in that it requires the presence of a human on the web-browser side. Hence system-to-system automation is not possible. Based on these and other pros and cons, this relationship type can be appropriate when an enterprise needs to exchange data with either a minor partner or a partner with less technological sophistication.

With respect to Hub-to-VAN-EDI, the vast majority of electronic inter-enterprise commerce takes place today by sending EDI over Value Added Networks. The advantage of this approach can be that system-to-system integration is possible and it is currently supported today. Disadvantages of this approach are: large costs to send data over proprietary VAN's; high administrative costs because of lack of true standardization; requirement for third party tools just to convert from the true "standard" to a form appropriate for the enterprise; no support for system-to-human integration; and no support for proprietary standards or corporate standards. Based on these and other pros and cons, this relationship type can be appropriate when supporting a legacy VAN-EDI environment.

With respect to hub-to-spoke, this relationship type also enables system-to-system integration like VAN-EDI. Architecturally hub-to-spoke is a collaboration between a hub engine and a spoke engine. The hub-to-spoke relationship can have advantages vis-a-vis VAN-EDI: it can use the public Internet to reduce network costs; administrative costs are much lower than VAN-EDI because a large portion of the hub-to-spoke relationship infrastructure can be centrally deployed and administered; true objects (in addition to just data) can be exchanged allowing for much more advanced collaborations; and multiple semantic standards can be supported including EDI, I2-CDM and Proprietary Community Standards. Based on the characteristics above, the hub-to-spoke relationship can be appropriate between enterprises that wish to perform sophisticated system-to-system collaboration. It can also be appropriate where no I2 TECHNOLOGIES' software is present in either of the enterprises. This is because the hub-to-spoke relationship can be centrally deployed by the hub enterprise.

With respect to hub-to-hub, the relationship is similar to hub-to-spoke except that it takes place between two hub engines rather than a hub and a spoke engine. Based on this characteristic, the hub-to-hub relationship can be appropriate between enterprises that wish to perform sophisticated system-to-system collaboration. Further, the hub-to-hub relationship can be appropriate when two enterprises have individually and separately purchased RHYTHM-GCM and have set up hub engines.

There are differences between hub engines and spoke engines. In general, a hub engine's capabilities are a superset of a spoke engine's capabilities. The following table provides an example of some of the differences.

TABLE 1

|  | Spoke Engine | Hub Engine |
| --- | --- | --- |
| Purchasing and Deployment | Spoke engines are bundled with a hub engine. Hence a hub enterprise will typically purchase a hub engine and a number of spoke engines which it can deploy out to its partners. | Sold separately. |
| Relationship types supported | Can only support the hub-to-spoke relationship. Additionally, each spoke engine can only communicate with a particular hub engine (its owning hub). | Supports hub-to-hub, hub-to-spoke, hub-to-web and hub-to-VAN-EDI relationship types. |
| Authoring Collaborations | Can view but not author a collaboration. | Can view and author a collaboration. |
| Internal-User Roles. | Supports a single internal-user role. | Supports multiple internal- user roles. |

Security

A further problem with collaboration is the challenge of providing comprehensive security. Before enterprises can collaborate effectively, the security issue needs to be addressed. There are many different facets to security in a collaborative context. Any multi-enterprise collaborative framework should address all of these different facets. The requirements for a collaborative security framework can include that: data exchanged between two partners should only be seen by the two partners; data exchanged between two partners should be tamper-proof; an enterprise should be able to verify that a partner is who it claims to be; the framework should not introduce new security holes into a partners' network; and the framework should be relatively easy to set up and administer.

A secure collaborative framework can be provided by implementing a comprehensive security strategy to address the above requirements. In one embodiment, the strategy has three different aspects to it: technological security, a permissibility framework and data partitioning.

Technological security can refer to the technological means used to guarantee security. This security can be used to provide: privacy, authentication and data integrity. Privacy ensures that no unauthorized person can see the data. Authentication involves authenticating that the parties in the collaboration are really who they claim to be. Data Integrity involves making it impossible for an unauthorized person to modify data being sent in any fashion.

The precise security approach can vary based on the relationship type described earlier. For example, one scheme is detailed in the table below:

TABLE 2

| Relationship Type | Technological Approach | Provided By |
| --- | --- | --- |
| Hub-to-web | HTTP-over-SSL 3.0 (e.g., Diffie-Helman) | Global Collab Workspace |
|  | HTTP-over-SSL 3.0 (e.g, RSA) |  |
|  | IIOP-over-SSL 3.0 | Global Collab Workspace |
| Hub-to-spoke | HTTP-over-SSL 3.0 (e.g, Diffie-Helman) | Global Collab Workspace |
|  | HTTP-over-SSL 3.0 (e.g., RSA) | Global Collab Workspace |
|  | IIOP-over-SSL 3.0 | Global Collab Workspace |
| Hub-to-hub | TCP/IP-over-SSL 3.0 | Global Message Bus |
|  | Content-based Encryption | Global Message Bus |
| Hub-to-VAN EDI | Security handled by VAN. | VAN |

As can be seen from the table, all of the relationship types, with the exception of Hub-to-VAN EDI, could support security via SSL 3.0.

SSL 3.0 is an industry standard protocol used to support public key encryption over a socket-based connection and provides: privacy, client as well as server authentication, data integrity and certificate management. SSL 3.0 is a higher level protocol into which several public-key cryptography algorithms can be plugged including RSA and Diffie-Helman.

Once the SSL handshake is complete, the next step is username-password authentication. This provides authentication beyond what SSL 3.0 itself provides. Passwords can be stored using PKCS5 password-based encryption (an RSA standard). Once a user or spoke is authenticated, it is returned an Access Token. This access token has an administrator-specifiable lifetime. A user can then access the system for the duration of validity of the access token. This has the beneficial effect of not requiring authentication on each access. Each application which is accessed, authenticates the access token by validating the signature (which is a digest encrypted using the Security Manager's private key) of the Security Manager.

The technological security framework is a portion of the security scheme. The other portion has to do with the design of the collaborations themselves. The framework should allow enterprises to easily attach permissibilities to various actions that other enterprises can perform on it. The global collaboration workspace can support a hierarchical permissibility model with individual permissibilities attached to different data elements in the hierarchy. In particular, it can support user-specific and spoke-specific read, write, take and subscribe permissibilities. Hence, enterprises can finely tune who can read what data, who can write what data, who can take what data and who can subscribe to write-notifications on what data.

A third element in the collaboration framework security strategy is the ability to partition data across various collaborative workspaces. In particular, the collaborative workspaces are split into an internal collaborative workspace and an external collaborative workspace. Only data that needs to be truly shared with partners is in the external collaborative workspace. The rest is in the internal collaborative workspace. The external collaborative workspace is designed to sit either outside the corporate firewall or in an Extranet or DMZ. The collaboration framework design does not require the external collaborative workspace to make connections through the corporate firewall into the Intranet (although it could).

In one embodiment, global collaborations can use both the external and internal collaborative workspaces. Local collaborations can use only the internal collaborative workspace and are hence completely invisible to partner enterprises. Even for global collaborations only the relevant portions use the external collaborative workspace. Furthermore, because of the permissibility framework described earlier, each partner enterprise can only see (read, write, take, subscribe) to its own data.

Figure 8:
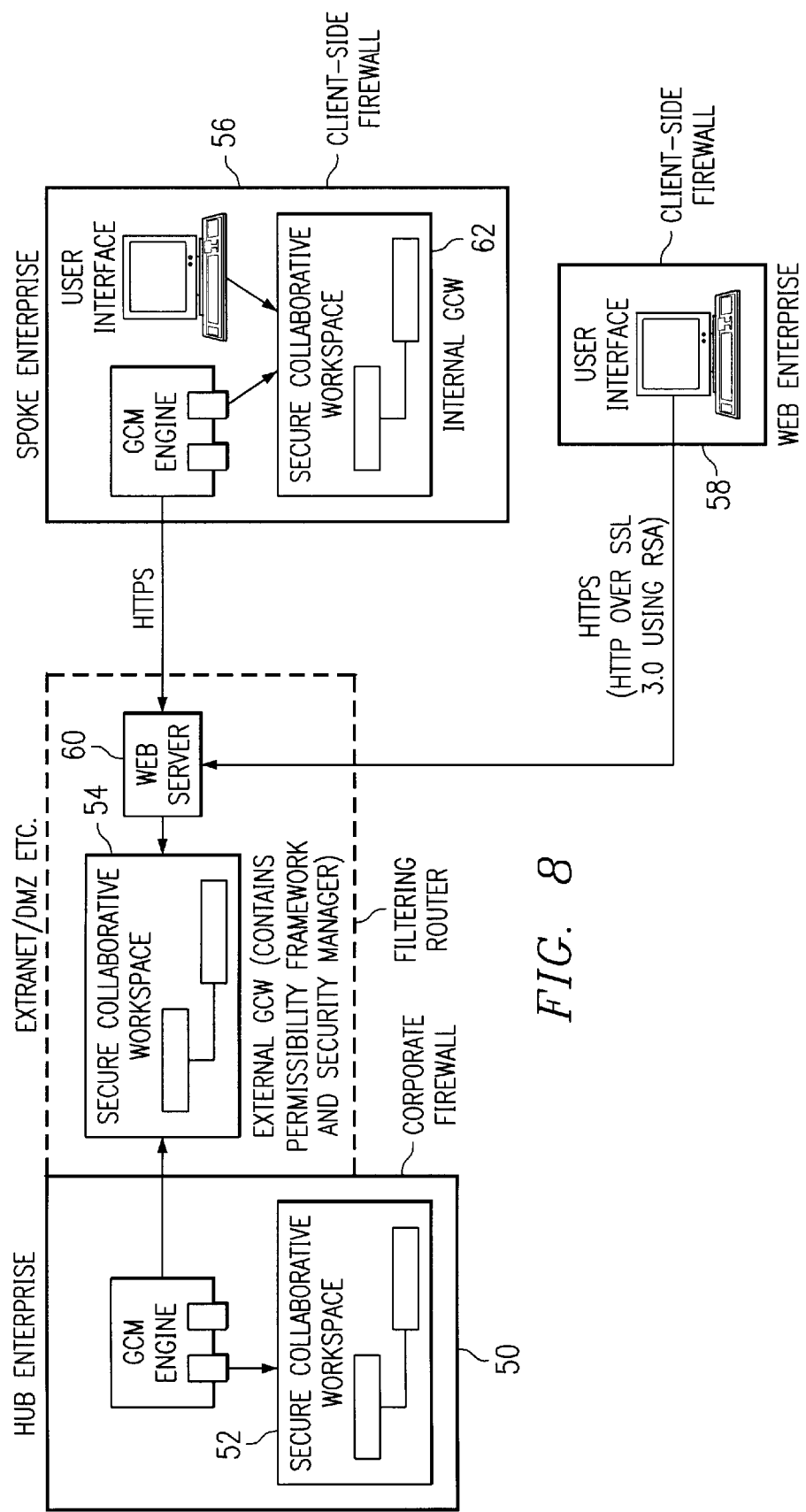
FIG. 8 is a block diagram of one embodiment of a security configuration for a hub-to-spoke and hub-to-web case.

FIG. 8 is a block diagram of one embodiment of a security configuration for a hub-to-spoke and hub-to-web case. As shown, a hub enterprise 50 is coupled to and communicates with an internal global collaboration workspace 52 and an external global collaboration workspace 54. A spoke enterprise 56 and a web enterprise 58 connect through a web server 60 to the external global collaboration workspace 54. Spoke enterprise 56, like hub enterprise 50, has an internal global collaboration workspace 62. The enterprises 50, 56 and 58 can be protected by associated firewalls, while the extranet formed by web server 60 and external global collaboration workspace 54 can be protected by a filtering router and communication via HTTP over SSL 3.0.

Figure 9:
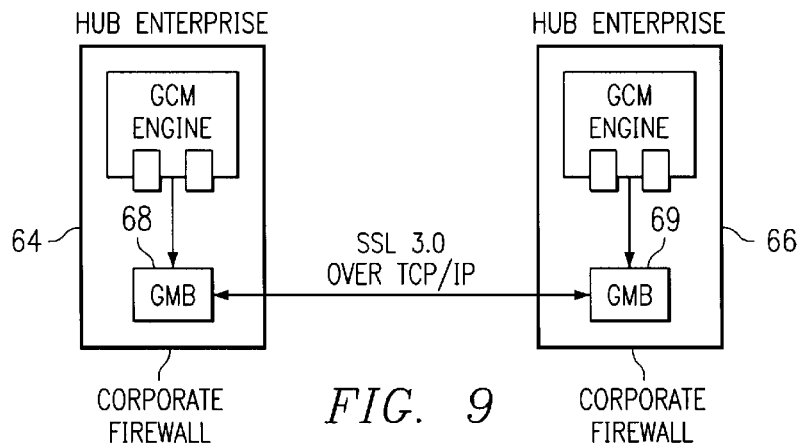
FIG. 9 is a block diagram of one embodiment of a security configuration for a hub-to-hub case.

FIG. 9 is a block diagram of one embodiment of a security configuration for a hub-to-hub case. As shown, a hub enterprise 64 and a hub enterprise 66 can communicate across an SSL 3.0 protected TCP/IP connection. The communication can be between separate global message brokers 68 and 69. Both hub enterprises 64 and 66 are protected by a firewall, as shown.

Inter-Enterprise Workflows

One of the problems with multi-enterprise decision support can be that there is no closed loop collaboration. Instead, data may be lobbed from one enterprise to the next with no coherent workflow. In order to implement closed loop collaboration, support for creating multi-enterprise workflows is necessary. The present global collaboration manager and designer can make it possible to construct, deploy, monitor and change sophisticated multi-enterprise workflows.

In general, a "workflow" can be a set of "activities" joined together by data flows that together accomplish some task. Workflows are typically executed on workflow engines. A "distributed workflow" can refer to a workflow that is executed on multiple workflow engines. In other words, different portions of the workflow execute on different engines. A "node" can refer to the abstract entities on which different workflow engines of a distributed workflow run, and a "node group" can be a set of nodes grouped by some characteristic. A "multi-enterprise distributed workflow" can be distributed workflows where the nodes are enterprises.

Parameterization of workflows can be important for enterprise collaboration. A "parametric workflow" is a workflow that is parameterized over some variable and can be regular or distributed. Instantiating the parametric workflow with different values of the parameter variable(s) produces different instances of the workflow. A "distributed workflow parameterized over nodes in a node group" can refer to distributed workflows where the parameters of the workflow are the nodes in a node group. Hence, when the workflow is instantiated it is tailored to a particular node in a node group.

There are several important features to the workflows that can be supported by the present global collaboration. These workflows can be strongly typed. Strong typing can be essential in producing robust, error-free workflows. In essence, strong typing guarantees the type of a message at design time. For example, if the workflow is designed to send a Bill of Materials, then strong typing ensures that it is physically impossible that an object other than a Bill of Material is sent. For a workflow designed with the global collaboration designer and executed with the global collaboration manager, it can be made impossible to even send an object of an incorrect type. This capability is important to producing robust, error-free workflows.

Despite strong typing, there are, for example, two scenarios in which wrong object types could conceivably be passed in the workflow: due to an error on the workflow designer's part; and a malicious attempt by someone to undermine the workflow. Both of these scenarios can be handled. The first can be handled by making it impossible for an error in design to lead to such a scenario. The second can be handled by making the data flows tamper-proof by using public key cryptography or other encryption scheme (integrity characteristic) as described above.

Another important feature is support for workflows parameterized over groups. Some multi-enterprise workflows involve a large number of enterprises. In such cases it can become impractical to create individualized workflows for each partner. Instead it can be advantageous to create workflows that are parameterized over groups of partners. For example, in the realm of procurement, two groups may be primary suppliers and secondary suppliers. The primary suppliers group could have one type of workflow, and the secondary suppliers group could have another type of workflow. Group-based workflows can be parametric in the sense that, at run time, an actual workflow can be created specific to a member of a group.

In the multi-enterprise context, an enterprise may collaborate, for example, with potentially hundreds or thousands of other enterprises. Each collaboration or multi-enterprise workflow can be potentially (and typically) unique. However, designing thousands of specialized workflows with an enterprises' partners is neither desirable nor feasible. On the other hand, many of these workflows are simply parametric variations on an underlying parameterized workflow. For example, a company A may be collaborating (on sales) with retailers, distributors, direct sales etc. Hence, it makes sense to group the various partners. An example grouping may be: WalMart; Sears; Rest of Retailers besides WalMart and Sears (group); Primary Distributors (group) and Secondary Distributors (group). Now, the workflows with all the members, for example, of the primary distributors group are variations on an underlying parametric distributed workflow, parameterized over the particular distributor in that group.

Workflows parameterized over groups can be supported by a HETEROCASTING workflow definition technique. The HETEROCASTING definition technique generally involves using a parameterized workflow definition to instantiate heterogeneous workflows based upon differences in the parameters. Thus, the HETEROCASTING definition technique allows a non-parametric distributed workflow to be easily (through a visual design tool) be made parametric over nodes in a node group. There can be two primary workflow activities used to accomplish this definition: a HETEROCAST split activity and HETEROCAST join activity. All activities between a HETEROCAST split and a HETEROCAST join are parameterized over the nodes of a node group that these activities correspond to.

Figure 10:
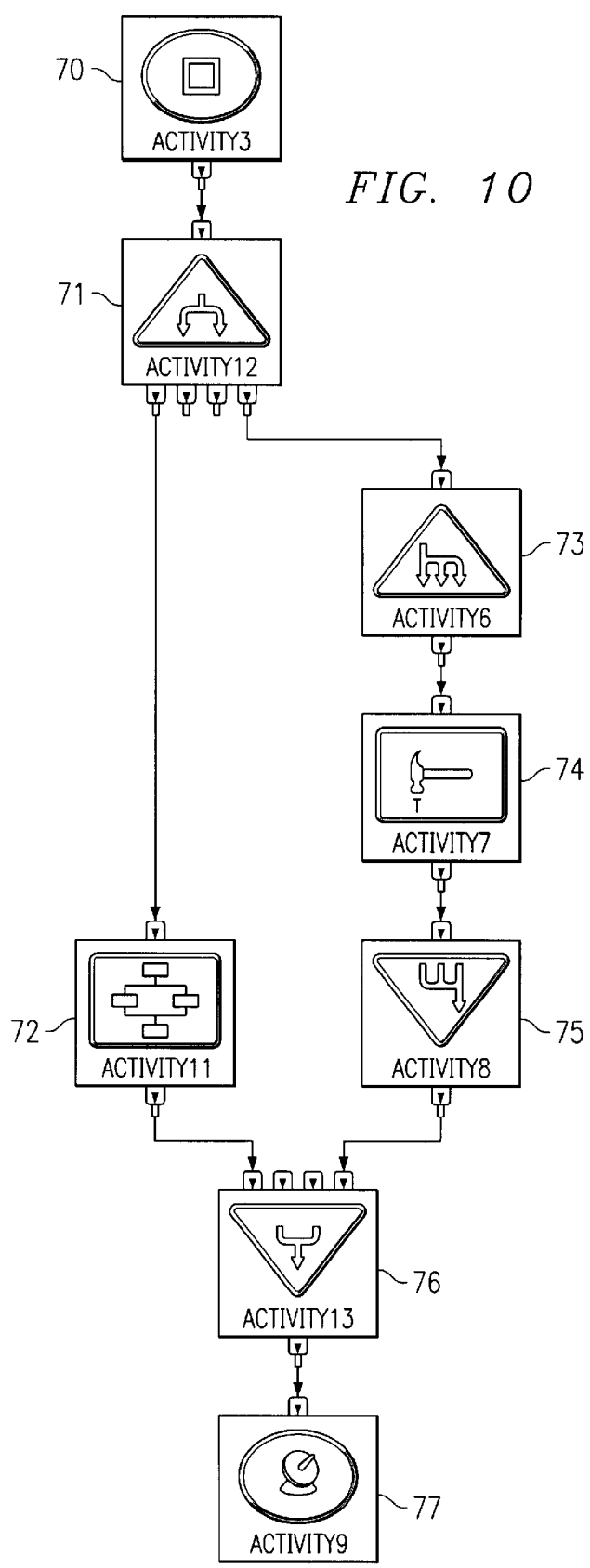
FIG. 10 is a diagram of one embodiment of designing an inter-enterprise workflow that includes parameterization over groups.

FIG. 10 is a diagram of one embodiment of designing an inter-enterprise workflow that includes parameterization over groups. As shown, the workflow can begin with a listening activity 70 that waits for some event. Activity 70 can be linked to parallel activity split 71 that links to a sub-workflow 72 and to a heterocast split 73. Sub-workflow 72, itself, can include a workflow definition. With respect to HETEROCASTING, the workflow after heterocast split 73 then becomes parameterized. Thus, in the example of FIG. 10, activity 74 is a parameterized activity. After activity 74, a heterocast join 75 receives flow from activity 74. Sub-workflow 72 and heterocast join 75 are linked to a synchronous or asynchronous join 76 which, in turn, links to an integrated event 77 (e.g., multicasting). A workflow like that of FIG. 10 can be designed using the present global collaboration designer and can allow full representation of workflow for inter-enterprise decision support. This workflow can then be instantiated and implemented through the present global collaboration manager.

Figure 11:
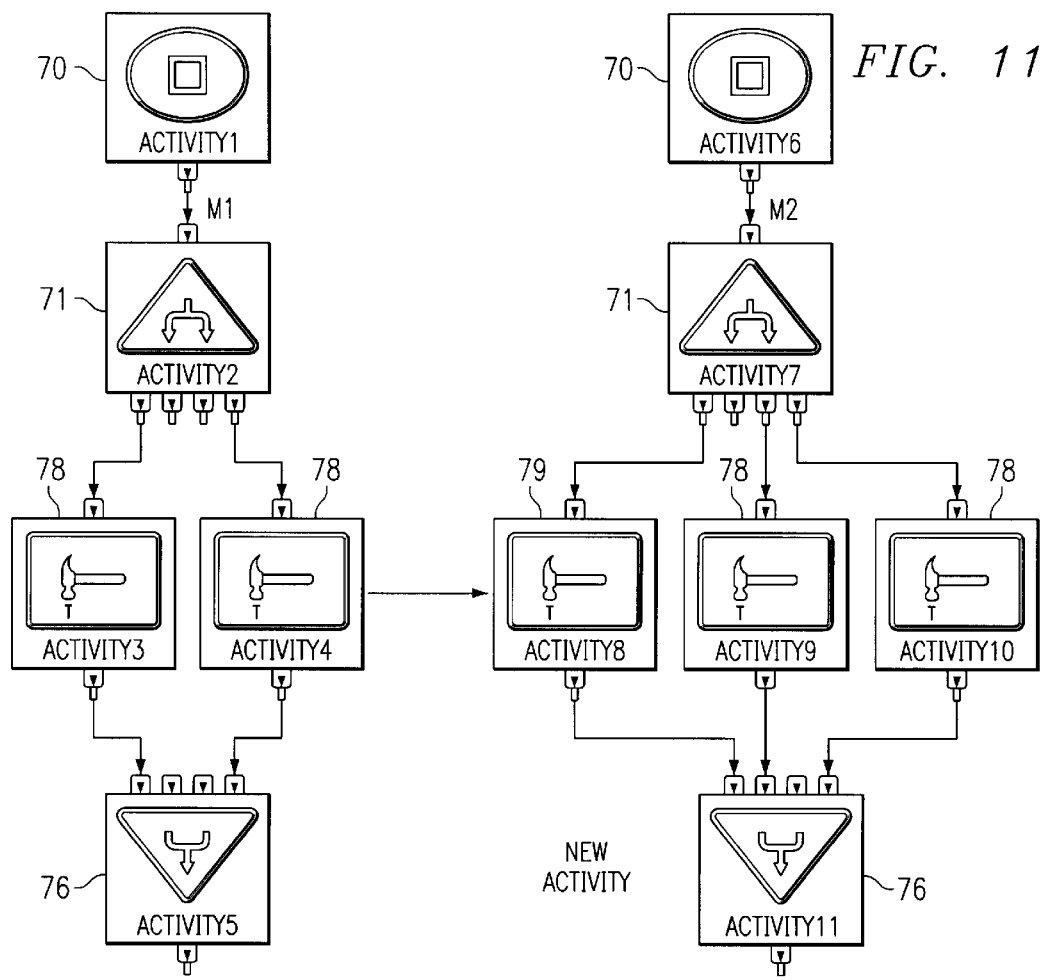
FIG. 11 is a diagram of one embodiment of managing change be modifying a design of a workflow.

FIG. 11 is a diagram of one embodiment of managing change by modifying a design of a workflow. As shown, an initial workflow design can have an event 70 linked to a parallel activity split 71. Between activity split 71 and a join 76, there can be, for example, two activities 78. This work flow, once designed, can be instantiated and implemented using the global collaboration manager. If a change needs to be made to the workflow, the global collaboration designer greatly alleviates the trouble of making the change. For example, a new activity 79 can be added between split 71 and join 76. The workflow can then be centrally reinstantiated and implemented.

In particular, the HETEROCAST technique can allow the construction of distributed workflows parameterized over nodes in a node group. This can allow a huge productivity gain over designing individual workflows for individual group members. Further, this technique makes rapid design and prototyping of sophisticated inter-enterprise workflows with hundreds or thousands of partners feasible. The technique should be distinguished from conventional "multicasting" in which identical messages are sent out to the various nodes (partners). In essence, multicasting allows you to design a single workflow that runs identically across multiple nodes. This differs from the HETEROCASTING technique, where the workflows run differently based on which node they are running across.

Figure 11A:
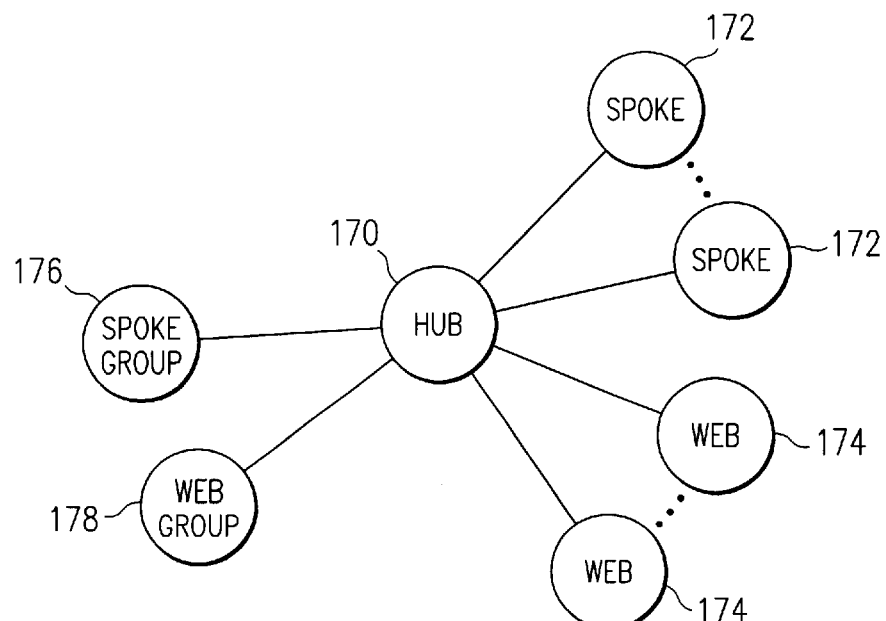
FIGS. 11A and 11B are a diagrams of another embodiment of designing an inter-enterprise workflow that includes parameterization over groups.
Figure 11B:
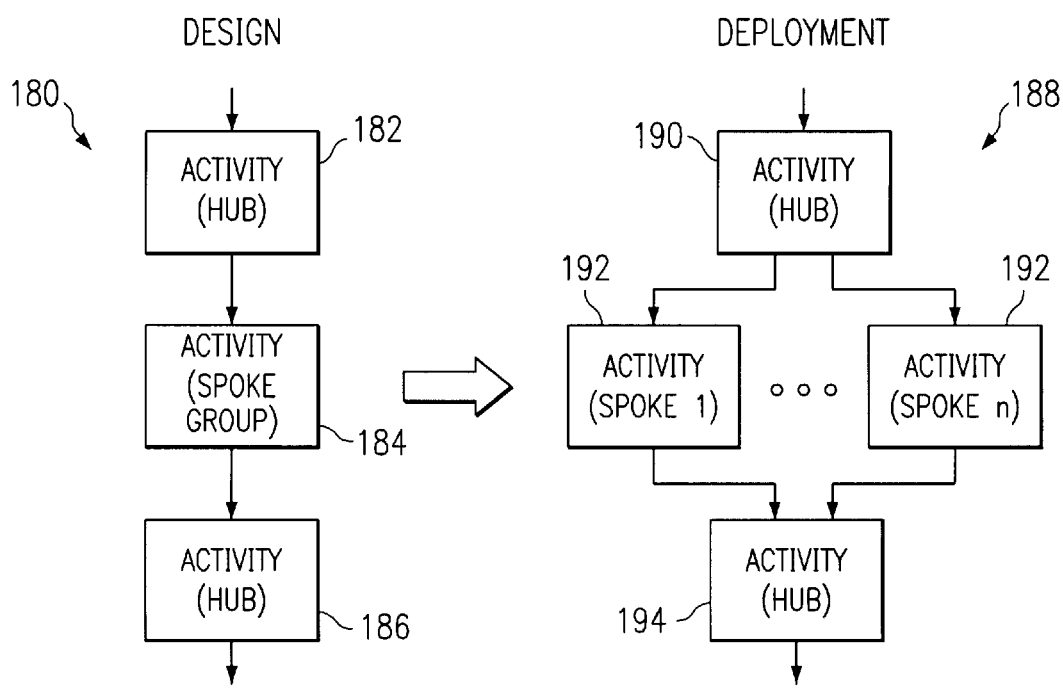

FIGS. 11A and 11B are a diagrams of another embodiment of designing an inter-enterprise workflow that includes parameterization over groups. As has been described above, a hub node 170 can be coupled to spoke nodes 172 and web nodes 174. In addition, hub node 170 can be coupled to a spoke group 176 and a web group 178. In general, spoke group 176 comprises a collection of related spoke nodes, and web group 178 comprises a collection of related web nodes.

As mentioned above, in designing a workflow that executes on multiple nodes within spoke group 176 or web group 178, the problem arises how to design for the separate nodes within the group. It is a disadvantage for a designer to be forced to design workflow activities specific to node. This can be time consuming and inflexible. It is better to provide the designer with an ability to parameterize over the node group and treat the nodes more generally with respect to common characteristics. The HETEROCASTING workflow definition technique construct described above provides one solution to this problem and allows parameterization over a node group.

According to the present invention, an exemplar workflow provides another solution to parameterization over nodes and can be used in the design and deployment of a workflow for enterprise collaboration. The exemplar workflow allows a designer to design a workflow as if the workflow is crossing over a single node (the exemplar node) in a node group. At run time or deployment, actual nodes in the node group can then be substituted for the exemplar node when the workflow is instantiated, deployed and executed.

One embodiment of the use of an exemplar workflow in the design and deployment of a workflow is shown in FIG. 11B. An example workflow design, indicated generally at 180, can include a first activity 182 that is to be executed on a specified hub node. Next, workflow design 180 includes an activity 184 that is to be executed on nodes within a spoke group. In workflow design 180, activity 184 is designed using an exemplar workflow that represents execution of activity 184 on an exemplar node. The exemplar node generically represents nodes within the spoke group. Workflow design 180 further includes an activity 186 which is to be executed on the hub node. As an exemplar, activity 184 appears in workflow design 180 to be associated with a single node. However, activity 184 is parameterized over nodes in the spoke group and can be instantiated, deployed and executed with respect to two or more nodes within the node group. This provides a workflow designer with significant flexibility in the design and modification of workflows that distribute similar activities across related nodes.

As shown in FIG. 11B, a workflow deployment 188 generated from workflow design 180 has activities that match to the activities in workflow design 180. In workflow deployment 188, an activity 190 is deployed to the hub node based upon activity 180 defined in design workflow 180. A plurality of activities 192 are deployed to spoke nodes (1 to N) in the spoke group based upon exemplar workflow activity 184. When created and deployed, each activity 192 is made specific to its associated node. Workflow deployment further includes an activity 194 deployed to the hub node based upon activity 186 in workflow design 180.

In this manner, the workflow design can represent nodes in a spoke/web group as a single node (exemplar node) yet treat the exemplar node as more than one node during the deployment and execution of the workflow. Thus, during the design stage, exemplar workflows can be designed by assigning activities to the exemplar node. During instantiation and deployment, activities assigned to the exemplar node are replicated to the appropriate nodes in the node group. Different parameters are selected at run time based upon the appropriate spoke node being instantiated. This allows a designer to generate a generic or general workflow more easily that can be applied to numerous nodes within a node group.

The exemplar workflow is advantageous in allowing simplicity during the design phase and multiple deployment during run time for members of the node group. For example, returning to FIG. 11B, the hub node might be associated with a retail outlet, and the spoke nodes in the spoke group might be associated with suppliers to the retail outlet. In creating workflow design 180, the designer may want to execute the same or similar activity at each of the supplier nodes. Exemplar workflow 184 allows the designer to represent these activity as an activity to be executed on a single exemplar node. Thus, workflow design 180 is greatly simplified.

A third important feature is support for role-based workflows. Role-based workflows allow workflows to be specified using generic roles. This capability allows the creation of generic or templated workflows that can be instantiated in various scenarios. For example, the role types can be: partner roles, spoke roles; spoke group roles; web roles; web group roles; user roles. As an example of roles, partner roles refer to the different roles played by partners. Thus, one partner role in the case of procurement is primary supplier and secondary supplier.

Role-based workflows can lead to the concept of three different phases in the design and execution of a workflow. The design phase is the phase in which role-based workflows are defined. The instantiation phase is the phase in which roles are mapped to instances. For example, primary supplier may be mapped to a first company, and PO_approver may be mapped to John Doe. Third, the run time phase can be the phase in which the instantiated workflow runs.

A further important feature is the integration of automated workflows with user-oriented workflows. Workflows can often be described as having two varieties: automated system-to-system workflows, and user interface workflows. While there are workflows that are completely automated, and there are workflows that are completely user driven, most workflows have automated as well as user interface elements. The present global collaboration manager and designer do not need to make this artificial distinction between workflow types. Hence, the workflows can be automated in parts and interact with users in other parts. Both the automated parts and user parts can span multiple enterprises.

Integration with Outside World

Figure 12:
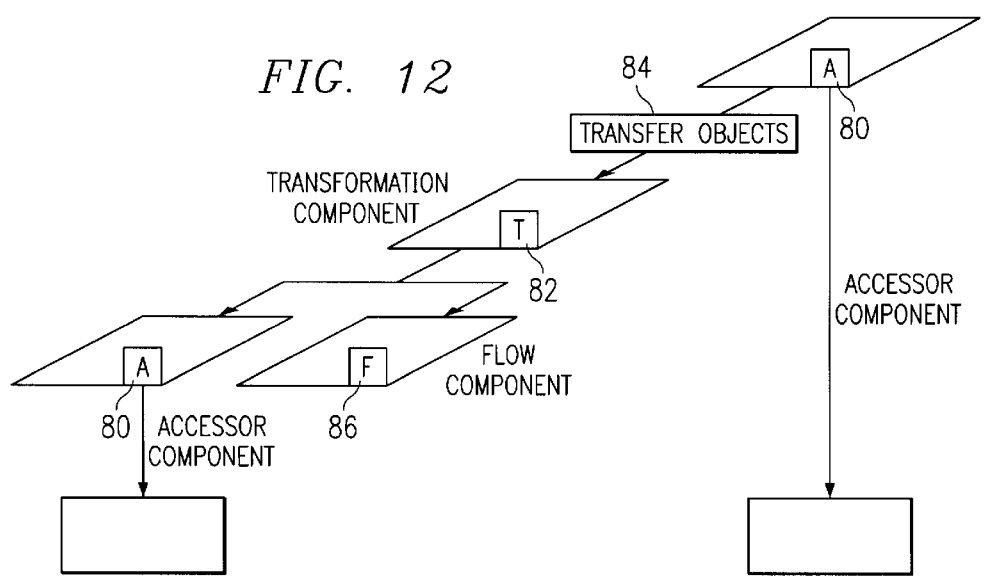
FIG. 12 is a diagram of one embodiment of integration of a workflow with the outside world.

FIG. 12 is a diagram of one embodiment of integration of a workflow with the outside world. As described in the previous section, sophisticated inter- and intra-enterprise workflows can be created. These workflows can be composed of activities strung together in various configurations. There is no restriction on what the different activities of the workflow can do, yet one of the major tasks of these activities is to integrate with the outside world. FIG. 12 shows how a workflow can be integrated with the outside world using a component-based approach to integration. The components can include accessors 80, transformations 82, transfer objects 84, adaptors and flows 86.

The global collaboration manager can support a component-based integration model. The component-based integration model allows flexibility in structuring the integration. There can be two types of components: primitive components and compound components. Primitive components can include accessors 80, transformers 82 and transfer objects 84. Compound components include adaptors and flows 86. Compound components are built in terms of primitive components. In this scheme, accessors 80 are used to access an external source such as SCP (SUPPLY CHAIN PLANNER), SAP, a relational database, web servers, email, message buses etc. Accessors 80 can be used to read, write or listen to sources and destinations of data. Transformers 82 can be used to transform data from one form to another form. Transfer Objects 84 are objects that can be passed from activity to activity or from enterprise to enterprise. Transfer objects 84 can be optionally convertible to EDI, XML, CORBA structures etc. Accessors 80 and Transformers 82 can be strung together to form flows. An entire flow can be executed in a single activity as shown in FIG. 13.

Figure 13:
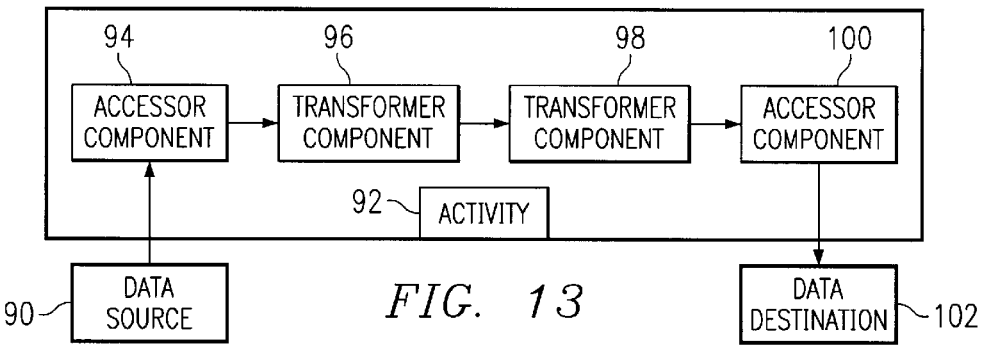
FIG. 13 is a diagram of one embodiment of a data flow running in a single activity.

FIG. 13 is a diagram of one embodiment of a data flow running in a single activity 92. As shown, a data source 90 can be accessible from and provide data to an accessor component 94. Accessor component 94 then can pass data through transformer components 96 and 98 which provide data to a second accessor component 100. Data can then be stored in a data destination 102.

Figure 14:
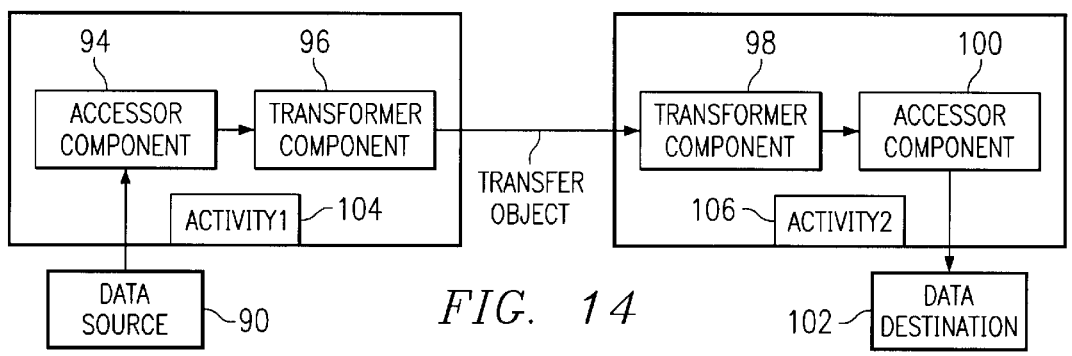
FIG. 14 is a diagram of one embodiment of a data flow split across multiple activities.

FIG. 14 is a diagram of one embodiment of a data flow split across multiple activities 104 and 106. As shown, the flow of FIG. 14 differs from that of FIG. 13 in that transformer components 96 and 98 are within separate activities 104 and 106 and communicate by a transfer object. Multi-enterprise data flows can be based on the model of FIG. 14 rather than that of FIG. 13.

With respect to transformations, in one embodiment, two fundamental transformation types can be supported: I2-CDM based transformations and direct transformations. I2-CDM based transformations are based on I2 TECHNOLOGIES' COMMON DATA MODEL (CDM). The CDM is an abstract schema that is available in both relational and object forms.

Figure 15:
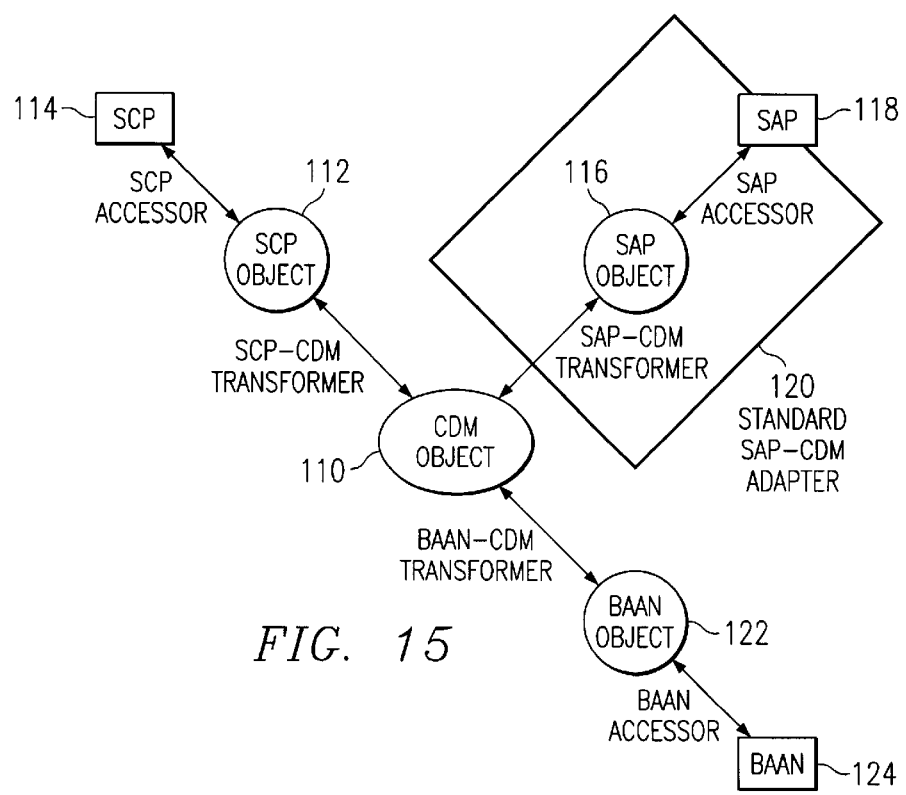
FIG. 15 is a block diagram of one embodiment of an common data model based transformation model.

FIG. 15 is a block diagram of one embodiment of an I2-CDM based transformation model. As shown, transformers and accessors can be coupled to transform a application data into a CDM data object 110 and vice versa. For example, a SUPPLY CHAIN PLANNER (SCP) object 112 can be created by an SCP accessor from SCP data 114. SCP object 112 can then be transformed by an SCP-CDM transformer into a CDM object 110. Analogously, an SAP object 116 can be created by an SAP accessor from SAP data 118. SAP object 116 can then be transformed by an SAP-CDM transformer into a CDM object 110. The SAP accessor and transformer, as with other accessors and transformers, can be combined into a standard SAP-CDM adapter 120 that can be used for CDM-based transformations other components. As another example, a BAAN object 122 can be created by a BAAN accessor from BAAN data 124. BAAN object 122 can then be transformed into a CDM object 110 by a BAAN-CDM transformer. These transforms work in the other direction as well.

Figure 16:
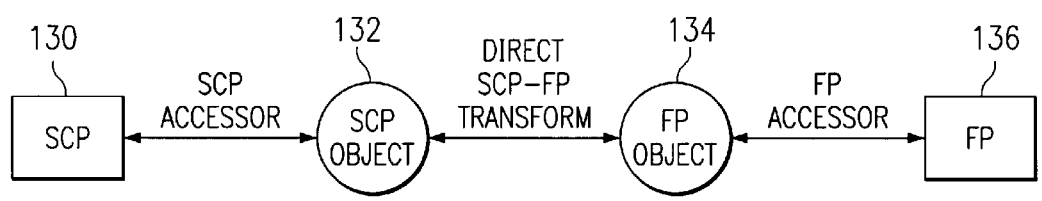
FIG. 16 is a diagram of one embodiment of a direct transformation.

FIG. 16 is a diagram of one embodiment of a direct transformation. In direct transformers, objects are converted from one form to another without passing through an intermediate format. For example, as shown in FIG. 16, SUPPLY CHAIN PLANNER (SCP) data 130 can be accessed by an SCP accessor to create an SCP object 132. SCP object 132 can then be directly transformed to a FACTORY PLANNER (FP) object 134. FP object 134 can then become FP data 136 through an FP accessor. This data flow can operate in the other direction as well.

In these processes, there are various levels of granularity at which access and transformation can take place including the relational (table), generic object (tree, graph, matrix etc.) and specific object (Bill of Material, Plan etc.) levels.

Sometimes access may only be available at one level (say tables), but transformation may be more appropriate at another level (say generic object). For example, hierarchical aggregation (a form of transformation) is often appropriate on a tree object. However, the data may only be accessible in a tabular form. In this case, for example, the data should be accessed at the tabular level, transformed into a tree, and then have the hierarchical aggregation applied to it.

FIG. 17 is a diagram of one embodiment of different access and transformation levels. As shown, access and transformation can have three levels. A first level 140 can involve table access and transforms. A second level 142 can involve generic object (tree, graph, etc.) access and transforms, and a third level can involve specific object (Bill of Materials (BOM), plan, etc.) access and transforms. In additional to transforms between application formats, there can also be transforms between the three levels, as shown.

Deployment of Collaborations

One important factor in a multi-enterprise collaboration system is the ease with which the collaboration can be deployed. As discussed, the present global collaboration manager can support four different kinds of partner relationships: hub-to-web, hub-to-spoke, hub-to-hub and hub-to-VAN-EDI. Of these four, hub-to-web has all the deployability characteristics of traditional web applications. Hub-to-VAN EDI can be deployable to the extent that it leverages an existing VAN-EDI infrastructure. While the hub-to-web relationship is highly deployable, it can suffer from the problem of requiring a human on the web side of the relationship. In other words, it may not be suited to system-to-system collaboration.

The hub-to-spoke solution can provide maximal deployability in the system-to-system collaboration environment. In the hub-to-spoke realm, the spoke engine is analogous to the web browser, and the spoke portion of the collaboration is analogous to a web page or applet. Similar to a web-page or applet, the spoke portion of the collaboration can be centrally designed and deployed to the remote spoke engines. Unlike a web-page or applet, there may still be integration that needs to be done remotely. This remote integration may be unavoidable but can be circumscribed and precisely defined by the spoke portion of the collaboration.

Another aspect of deployability is handling versioning. Collaborations once designed and deployed are likely to need changing (in various different ways) as time progresses. It can be important that subsequent versions of collaborations be as easily deployable as initial versions. The present global collaboration manager can provide complete support for versioning and centralized redeployment of collaborations. Further, different versions of collaborations can be run simultaneously without impacting each other. This allows an existing version to be gracefully phased out while another version is phased in.

Another element of the deployability of the present global collaboration manager is the leverage of existing infrastructure. This element is evident, for example, in the support of the hub-to-spoke relationship over existing web protocols. Supporting hub-to-spoke over existing web protocols can be important to rapid deployment since it does not require modification or reconfiguration of an existing web infrastructure. A large time savings in this regard can come from not having to modify carefully designed firewall and security infrastructures that may already be in place.

Supporting Many-To-Many Collaborations

The present hub-and-spoke architecture provides easy manageability and deployment. However, in practice enterprises collaborate with many enterprises which in turn collaborate with still other enterprises. Hence, enterprises often form a collaborating web or graph. This can be supported via the ability to substitute a hub engine for a spoke engine at any time. This substitution ability allows many-to-many collaboration webs to be grown organically rather than all at once.

Figure 18:
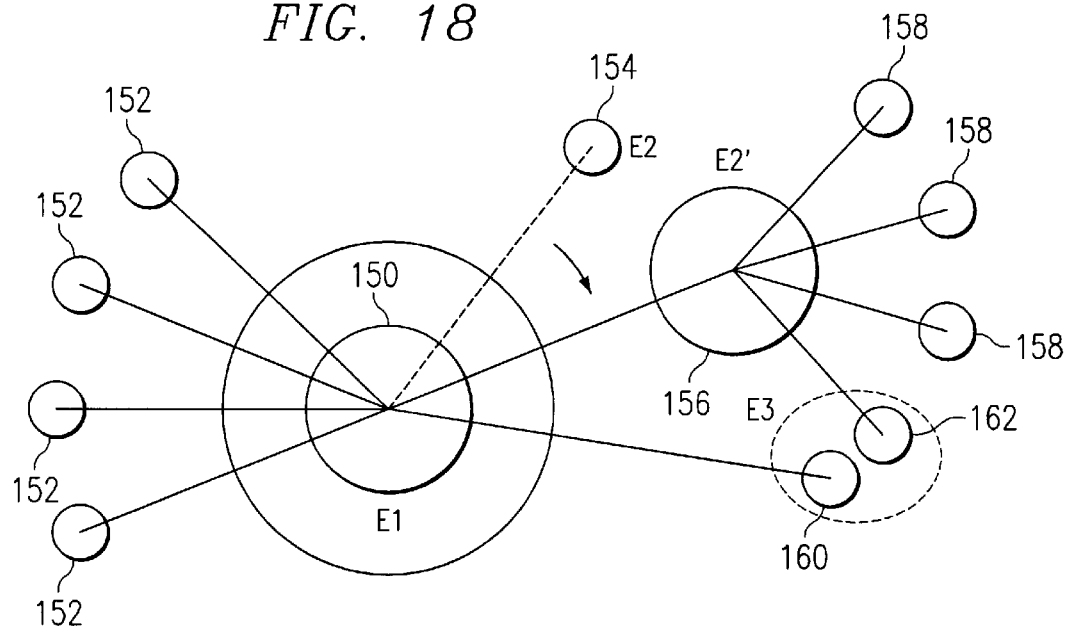
FIG. 18 is a diagram of one embodiment of substituting a hub engine for a spoke engine within a collaboration.

FIG. 18 is a diagram of one embodiment of substituting a hub engine for a spoke engine within a collaboration. As shown, an enterprise (E1) may deploy a hub engine 150 on itself and a spoke engine 152 at all of its partner sites. In particular, a spoke engine 154 may be at a partner site (E2). If the partner site (E2) wishes to design and control its own collaborations, it can replace spoke engine 154 with a hub engine 156. From E1's perspective, E2 can still be a spoke in E1's collaboration. However, this spoke now runs on a hub engine 156 which can control its own collaborations with spoke engines 158. Further, spoke engines 160 and 162 might be associated with a third entity (E3) that interacts with both hub engine 150 and hub engine 156 on behalf of E3.

Extension of Framework

An important aspect of the present framework is extensibility. Without extensibility, the framework may not be able to handle new situations and challenges with which it is confronted. There can be several different dimensions to this extensibility. For example, one primary area of extensibility is in the area of semantic object standards. If supported standards do not suffice for a particular problem, then the framework can be augmented with new semantic standards. Additionally the framework allows the building of proprietary semantic standards. Further, the framework can be extended by adding new accessors, transformers, adapters, etc. The standard component library can be extended both generally and by end-users.

Although the present invention has been described in detail, it should be understood that various changes, substitutions and alterations can be made hereto without departing from the spirit and scope of the invention as defined by the appended claims.

What is claimed is:

1. A system providing collaboration between two or more enterprises, the system comprising a collaboration manager operable to:

access a workflow design comprising at least one parametric activity associated with one exemplar node generically representing a plurality of nodes within a node group, the parametric activity being parameterized over the nodes within the node group;

generate a workflow according to the workflow design, the workflow comprising one or more generated activities based on the parametric activity, each of the generated activities being executable at one of the nodes within the node group; and deploy each generated activity to a node within the node group at which the generated activity is executable.

2. The system of claim 1, wherein the nodes within the node group are spoke nodes.

3. The system of claim 1, wherein the nodes within the node group are web nodes.

4. The system of claim 1, wherein the parametric activity is immediately preceded in the workflow design by a preceding activity executable at a hub node and immediately followed in the workflow design by a following activity executable at the hub node.

5. The system of claim 1, wherein the generated activities based on the parametric activity are:

preceded in the workflow by a preceding activity executed at a hub node;

deployed according to the preceding activity;

executed concurrently; and followed in the workflow by a following activity executed at the hub node.

6. The system of claim 1, wherein:

the workflow comprises one or more hub activities executed at a hub node; and the generated activities are deployed according to at least one of the hub activities.

7. The system of claim 6, wherein the hub node and the nodes within the node group are located within different enterprises.

8. The system of claim 7, wherein the hub node is associated with a retail enterprise and the nodes within the node group are associated with supplier enterprises that supply the retail enterprise.

9. A method for collaboration between two or more enterprises, comprising:

accessing a workflow design comprising at least one parametric activity associated with one exemplar node generically representing a plurality of nodes within a node group, the parametric activity being parameterized over the nodes within the node group;

generating a workflow according to the workflow design, the workflow comprising one or more generated activities based on the parametric activity, each of the generated activities being executable at one of the nodes within the node group; and deploying each generated activity to a node within the node group at which the generated activity is executable.

10. The method of claim 9, wherein the nodes within the node group are spoke nodes.

11. The method of claim 9, wherein the nodes within the node group are web nodes.

12. The method of claim 9, wherein the parametric activity is immediately preceded in the workflow design by a preceding activity executable at a hub node and immediately followed in the workflow design by a following activity executable at the hub node.

13. The method of claim 9, wherein the generated activities based on the parametric activity are:

preceded in the workflow by a preceding activity executed at a hub node;

deployed according to the preceding activity;

executed concurrently; and followed in the workflow by a following activity executed at the hub node.

14. The method of claim 9, wherein:

the workflow comprises one or more hub activities executed at a hub node; and the generated activities are deployed according to at least one of the hub activities.

15. The method of claim 14, wherein the hub node and the nodes within the node group are located within different enterprises.

16. The method of claim 15, wherein the hub node is associated with a retail enterprise and the nodes within the node group are associated with supplier enterprises that supply the retail enterprise.

17. Software for collaboration between two or more enterprises, the software embodied in a computer-readable medium and when executed operable to:

access a workflow design comprising at least one parametric activity associated with one exemplar node generically representing a plurality of nodes within a node group, the parametric activity being parameterized over the nodes within the node group;

generate a workflow according to the workflow design, the workflow comprising one or more generated activities based on the parametric activity, each of the generated activities being executable at one of the nodes within the node group; and deploy each generated activity to a node within the node group at which the generated activity is executable.

18. The software of claim 17, wherein the nodes within the node group are spoke nodes.

19. The software of claim 17, wherein the nodes within the node group are web nodes.

20. The software of claim 17, wherein the parametric activity is immediately preceded in the workflow design by a preceding activity executable at a hub node and immediately followed in the workflow design by a following activity executable at the hub node.

21. The software of claim 17, wherein the generated activities based on the parametric activity are:

preceded in the workflow by a preceding activity executed at a hub node;

deployed according to the preceding activity;

executed concurrently; and followed in the workflow by a following activity executed at the hub node.

22. The software of claim 17, wherein:

the workflow comprises one or more hub activities executed at a hub node; and the generated activities are deployed according to at least one of the hub activities.

23. The software of claim 22, wherein the hub node and the nodes within the node group are located within different enterprises.

24. The software of claim 23, wherein the hub node is associated with a retail enterprise and the nodes within the node group are associated with supplier enterprises supplying the retail enterprise.

25. A system providing collaboration between two or more enterprises, comprising:

means for accessing a workflow design comprising at least one parametric activity associated with one exemplar node generically representing a plurality of nodes within a node group, the parametric activity being parameterized over the nodes within the node group;

means for generating a workflow according to the workflow design, the workflow comprising one or more generated activities based on the parametric activity, each of the generated activities being executable at one of the nodes within the node group; and means for deploying each generated activity to a node within the node group at which the generated activity is executable.

* * * * *